(12) United States Patent
Kane et al.

(10) Patent No.: US 6,415,480 B1
(45) Date of Patent: Jul. 9, 2002

(54) CLIP MECHANISM FOR A LINE

(76) Inventors: Tom Kane, 2850 Plumas St. #507, Reno, NV (US) 89509; Rodney M. Tuinstra, 4548 E. Carmen, Phoenix, AZ (US) 85044; Richard L. Carter, 2040 E. Knox, Tempe, AZ (US) 85284

( * ) Notice: Subject to any disclaimer, the term of this patent is extended or adjusted under 35 U.S.C. 154(b) by 0 days.

(21) Appl. No.: 09/525,568

(22) Filed: Mar. 15, 2000

(51) Int. Cl.[7] ............................................. F16G 11/00
(52) U.S. Cl. ................................................ 24/134 R
(58) Field of Search ............................ 24/132 R, 133, 24/134 KA, 134 L, 132 AA, 134 R

(56) References Cited

U.S. PATENT DOCUMENTS

| | | | |
|---|---|---|---|
| 419,960 A | * | 1/1890 | Kinney |
| 423,312 A | * | 3/1890 | Clark |
| 686,982 A | * | 11/1901 | Malins |
| 798,563 A | * | 8/1905 | Briggs |
| 1,229,690 A | * | 6/1917 | Waskom |
| 1,385,837 A | * | 7/1921 | Kistner |
| 1,494,022 A | * | 5/1924 | Roberson |
| 1,522,400 A | * | 1/1925 | Wagenbrenner |
| 1,719,182 A | | 7/1929 | Johansen |
| 2,185,723 A | | 2/1940 | Buckner |
| 2,198,187 A | | 4/1940 | Tolley et al. |
| 2,267,231 A | | 12/1941 | Coleman et al. |
| 2,513,169 A | * | 6/1950 | Griswold |
| 2,530,879 A | | 11/1950 | Hendrickson |
| 3,364,529 A | * | 1/1968 | Blacher |
| 4,179,148 A | * | 12/1979 | Johnson |
| 4,716,630 A | * | 1/1988 | Skyba |
| 4,998,327 A | | 3/1991 | Hull et al. |
| 5,133,111 A | | 7/1992 | Brown |

* cited by examiner

*Primary Examiner*—James R. Brittain
(74) *Attorney, Agent, or Firm*—Theodore J. Bielen, Jr.

(57) ABSTRACT

A clip mechanism for a line utilizing a first member having a first portion and a connected second portion. A second member with first and second portions connected to one another is also employed. The second member also possesses an end portion terminating in a plurality of protrusions. Each of the protrusions possesses a tip. The tips extend from the second member at different lengths such that at least, one tip lies closer to the first portion of the second member than another tip. In certain cases, the ends of the tips lie in an arcuate configuration that is particularly useful for gripping rounded lines.

5 Claims, 1 Drawing Sheet

CLIP MECHANISM FOR A LINE

BACKGROUND OF THE INVENTION

The present invention relates to a novel and useful clip mechanism for a line.

Lines and ropes shave been used since early times to secure items for towing, lifting, hanging, transporting, and the like. In any case, fasteners or clamps must be used in conjunction with lines in order to limit travel, to support or move an object, and for repair a separated line.

In the past, many fasteners have been developed to grip lines. For example, U.S. Pat. No. 2,185,723 shows a cable clamp in which a threaded member brings two U-shaped elements together to hold two cables in adjacent configuration.

U.S. Pat. No. 4,998,327 describes a traction hook and rope block in which a lever operated member pulls a line in place by squeezing the same toward a housing.

U.S. Pat. No. 2,267,231 describes a closeline fastener that utilizes a pivoting holder having a rounded edge for stopping a line between such edge and a washer.

U.S. Pat. Nos. 1,719,182, 2,198,187, 2,530,879, and 5,133,111 describe clamps for lines which employ a convex toothed member that pivots into position to hold a line between the edge of such member and a backing element.

In many cases, flat webbing has seen used to secure transportable materials. Webbing clamps are common to provide a support for materials by the formation of a loop. Unfortunately, when webbing breaks, the repairing of webbing requires sewing, riveting, or heat sealing of the webbing to effect a proper repair. In essence, such repair must be done under controlled conditions in a factory or repair facility.

A clamp mechanism for holding a line would be a notable advance in the field of fasteners and transportation of material goods.

BRIEF SUMMARY OF THE INVENTION

In accordance with the present invention a novel and useful clip mechanism for a line is herein provided.

A clip mechanism of the present invention utilizes a first member having a first portion and a connected second portion. Likewise, a second member is employed and also includes a first portion and a connected second portion. The second portion of the second member possesses an end area or zone which terminates in a plurality of protrusions. Each of the protrusions possesses a tip. The tips are formed such that at least one of the tips is closer to the first portion of the second member than the second and third tips on either side of the first tip. The tips may lie in an arcuate pattern which easily conforms to a rounded line or a line having bulk, as opposed to flat webbing.

Spring means is also found in the present invention for biasing the second portion of the second member to the second portion of the first member. In this manner, a line, which is passed between the first and second members, will be held by the first and second members, specifically between the tips of the second member and the second portion of the first member. The first and second members may be pivotally connected to one another by a pivot pin. The pivot pin may engage a pair of flanges provided by the first member.

In addition, the second portion of the first member may be angularly attached to the first portion of the first member. Thus, the line would run along the angular portion and be squeezed by the tips found on the end portion of the second portion of the second member and the second portion of the first member.

Moreover, the invention may include a bore through the first portion of the first member. Such bore would permit the passage of a line which may be easily knotted to connect the same to the clip of the present invention. The first and second portions may then be used to hold another portion of the line to effect a repair of the same.

It may be apparent that a novel and useful clip mechanism for a line has been hereinabove described.

It is therefore an object of the present invention to provide a clip mechanism for a line that is particularly adaptable to lines having roundness or bulk to hold the same in a secure manner.

Another object of the present invention is to provide a clip mechanism for a line that includes tipped protrusions that are particularly oriented to make secure contact with the line having a rounded exterior.

Another object of the present invention is to provide a clip mechanism for a line that is spring loaded to permit the easy securement and release of a line therefrom.

A further object of the present invention is to provide a clip mechanism for a line that permits the user to tear a broken line by easy securement of one end of the line by a simple knot and the other through a clamping mechanism.

Another object of the present invention is to provide a clip mechanism for a line which is simple to manufacture and use.

The invention possesses other objects and advantages especially as concerns particular characteristics and features thereof which will become apparent as the specification continues.

For a better understanding of the invention reference is made to the following detailed description of the preferred embodiments thereof which should be taken in conjunction with the prior described drawings.

DETAILED DESCRIPTION OF THE PREFERRED EMBODIMENTS OF THE INVENTION

Various aspects of the present invention will evolve from the following detailed description of the preferred embodiments thereof which should be referenced to the herein above-described drawings.

Figure 1:
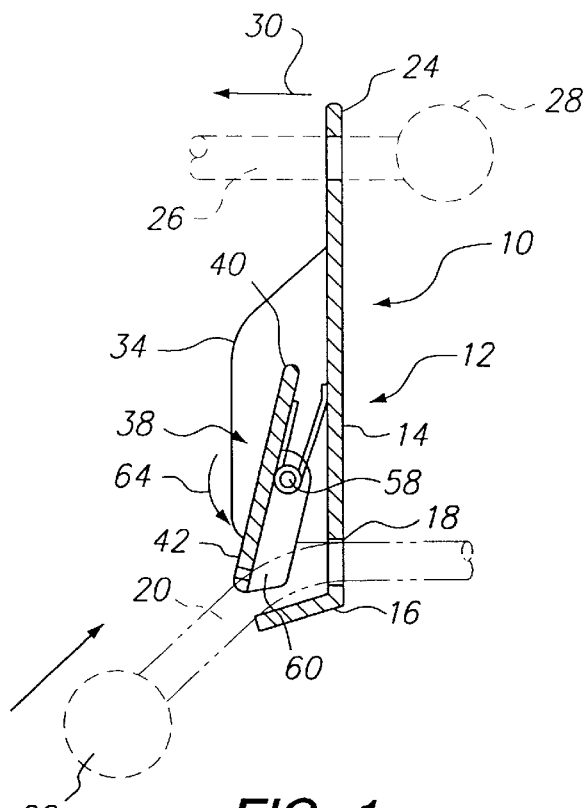
FIG. 1 is a sectional view of the mechanism of the present invention in use with two ends of a broken line.

The invention as a whole is depicted in the drawings by reference character 10. Mechanism 10 includes as one of its elements a first member 12 having a first portion 14 and an angulated second portion 16. An opening 18 is also employed in the present invention opening 18 permits a first line 20, depicted in phantom on FIG. 1, to pass through the same. First line 20 is also illustrated with an enlarged portion 22 representing a knot, or a stop, which prevents line 20 from passing through opening 18 beyond enlargement 22.

Likewise, an opening 24 is also depicted as passing through first portion 14 of first member 12. The second line 26 is capable of passing through opening 24. Again, an enlargement 28 is depicted to prevent line 26 from passing completely through opening 24 according to directional arrow 30. It should be noted that directional arrow 32 also indicates the direction in which enlargement 22 prevents line 20 from completely passing through opening 18. The importance of enlargements 22 and 28 will be discussed in more detail hereinafter. First member 12 also includes flanges 34 and 36 which connect to the contiguous edge 38 of first member 12 and extend outwardly therefrom. The flanges 34 and 36 may be attached to first member 12 as separate entities or formed integrally therewith.

Figure 2:
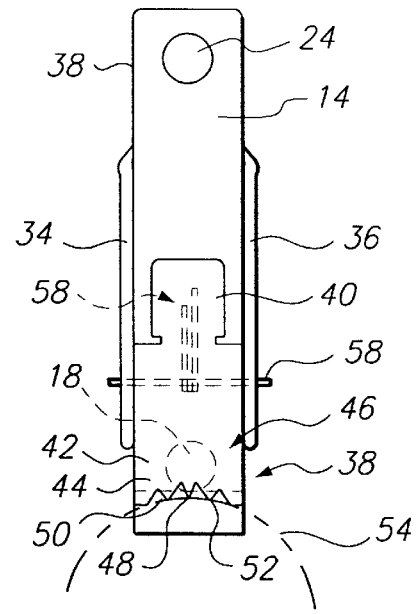
FIG. 2 is a top plan view of the mechanism of the present invention.
Figure 3:
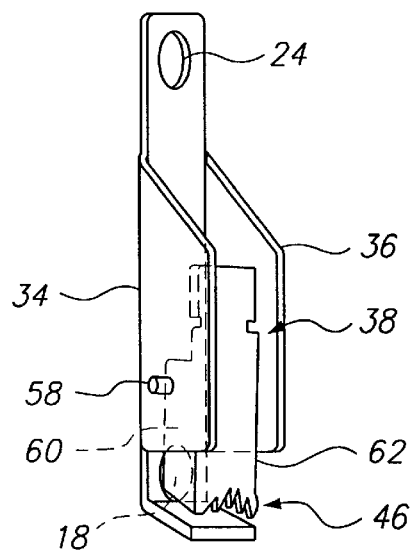
FIG. 3 is a top, left side perspective view of the mechanism of the present invention.

Mechanism 10 also possesses a second member 38. Second member 38 includes a first portion 40 and a connected second portion 42. Second portion 42 of second member 38 also possesses an end portion 44 terminating in a plurality of protrusions 46, FIGS. 2 and 3. As may be observed, each of the plurality of protrusions 46 possesses a tip. Viewing again FIG. 2, tip 48 lies adjacent tips 50 and 52. Tip 48 lies closer to first portion 40 of second member 38 than tips 50 and 52. Also, the tips 48, 50, and 52 may lie on an arcuate line or a theoretical curved strip 54.

Spring means 56 biases second portion 42 of second member 38 toward second portion 16 of first member 12. Spring means 56 is depicted as a volute spring, although any spring would suffice which biases the movement of second member 38 as described. Moreover, pivot pin 58, which engages plates 60 and 62 of second member 38, as well as flanges 34 and 36 of first member 12, permits such rotation, directional arrow 64.

In operation, line 20 is passed through opening 18 of first member 12. Enlargement 22, which may be a knot, is then placed in line 20 to prevent further passage completely through opening 18. The user then presses first portion 40 of second member 38. Line 20 is then lead between second portions 42 and 16 of second member 38 and first member 12, respectively. Pressure is then released from first portion 40 of second member 38 to permit spring means 58 to rotate second member 38 into contact with line 20. At this point plurality of protrusions 38 grip line 20, which may be rounded or bulky, as compared to flat webbing which is the preferred line configuration of the prior art. Any force along directional arrow 32 will be resisted such that line 20 is firmly gripped in place. At this point, enlargement 22 is only needed as a backup securement. Line 26 is also prevented from moving in the direction of arrow 30 by enlargement 28, which may also be a knot. It should be noted that knot 28 may be placed on the opposite side of first member 12 such that a force applied in a direction opposite to directional arrow 30 would prevent passage of line 26 through opening 24. In any case, line 20 and line 26 may constitute an initially integral line which has been parted accidentally. Thus, mechanism 10 may be used to effect a repair of such integral line by mechanism 10 and the simple use of a knot, such as enlargement 28. Thus, the use of rivets, sewing, heat-sealing, and other fastening methods, commonly used with webbing material, has been eliminated by the use of mechanism 10.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A clip mechanism for a line, comprising:
   a. a first member having a first portion and a second portion, connected to said first portion, said first portion of said first member including a bore therethrough adjacent said connection of said first portion to said second portion of said first member, said second portion of said first member being angularly connected to said first portion of said first member and extending outwardly from said bore through said first portion of said first member, the line passing through said bore;
   b. a second member having first portion and a second portion connected to said first portion, said second portion of said second member including an end portion terminating in a plurality of protrusions, each of said plurality of protrusions possessing a tip, a first tip of said plurality of tips lying closer to said first portion of said second member than a second and third tip lying on either side of said first tip;
   c. spring means for biasing said second portion of said second member to said second portion of said first member; and
   d. means for pivotally linking to said first member and to said second member to squeeze the line between said end portion of said second member and said second portion of said first member, outwardly from said bore through said first portion of said first member.

2. The clip mechanism of claim 1 in which said first member includes a pair of flanges exiting outwardly therefrom, and means for pivotally linking said first member to said second member includes a pivot pin pivotally engaging said pair of flanges and said second member.

3. The clip of claim 2 in which said spring means at least partially surrounds said pivot pin.

4. The clip mechanism of claim 1 in which said first, second, and third tips lie on an arcuate line.

5. The clip mechanism of claim 1 in which said bore through said first member first portion comprises a first bore and further comprises a second bore through said first member first portion, located further outwardly from said connection of said first member first portion to said first member second portion, than the location of said first bore.

* * * * *